US012224896B2

(12) United States Patent
Stewart et al.

(10) Patent No.: US 12,224,896 B2
(45) Date of Patent: Feb. 11, 2025

(54) SCORING EVENTS AS LIKELY CAUSE EVENTS IN A RESOURCE NETWORK

(71) Applicant: INTERNATIONAL BUSINESS MACHINES CORPORATION, Armonk, NY (US)

(72) Inventors: Kristian Jon Stewart, Surrey (GB); Jonathan Ian Settle, Dursley (GB); Yasser Abduallah, Bayonne, NJ (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 17/320,277

(22) Filed: May 14, 2021

(65) Prior Publication Data

US 2022/0368586 A1 Nov. 17, 2022

(51) Int. Cl.
*H04L 41/5041* (2022.01)
*H04L 9/40* (2022.01)
*H04L 41/0631* (2022.01)
*H04L 43/04* (2022.01)
*H04L 45/00* (2022.01)
*H04L 47/2408* (2022.01)
*H04L 47/2483* (2022.01)
*H04L 67/10* (2022.01)
*H04L 67/1014* (2022.01)

(52) U.S. Cl.
CPC .......... *H04L 41/0631* (2013.01); *H04L 43/04* (2013.01)

(58) Field of Classification Search
CPC ............................. H04L 41/0631; H04L 43/04
See application file for complete search history.

(56) References Cited

U.S. PATENT DOCUMENTS

| 7,043,661 | B2 | 5/2006 | Valadarsky |
| 10,505,825 | B1* | 12/2019 | Bettaiah .................. H04L 43/20 |
| 2015/0033084 | A1* | 1/2015 | Sasturkar ................ H04L 41/22 714/46 |
| 2015/0193696 | A1 | 7/2015 | Vasseur |
| 2017/0075749 | A1 | 3/2017 | Ambichl |
| 2017/0288979 | A1* | 10/2017 | Yoshihira .............. H04L 41/142 |
| 2018/0322283 | A1* | 11/2018 | Puri ...................... G06F 16/254 |
| 2019/0139383 | A1* | 5/2019 | Folsom ............ G08B 13/19682 |
| 2019/0158524 | A1* | 5/2019 | Zadeh ................... H04L 61/103 |

(Continued)

OTHER PUBLICATIONS

Grace Period Disclosure, IBM, Netcool Operations Insight V1.6.1, Jonathan Ian Settle et al., Jul. 28, 2020, 3 pages.

(Continued)

*Primary Examiner* — Clayton R Williams
(74) *Attorney, Agent, or Firm* — Jordan T. Schiller

(57) ABSTRACT

Method and system are provided for scoring events as likely cause events in a resource network. The method processes incoming events relating to resources in a resource network to correlate related events as a related group and maps the events of the related group onto nodes of a sub-topology representing resources of the resource network and having edges representing relationships between the resources. The method scores each event by discovering one or more paths between the node event and other node events of the related group, with the scoring based on a combination of an event classification weight and a discovered path score of aggregated relationship scores of edges of a discovered path.

21 Claims, 9 Drawing Sheets

(56) References Cited

U.S. PATENT DOCUMENTS

| | | | |
|---|---|---|---|
| 2019/0228296 A1 | 7/2019 | Gefen | |
| 2019/0286504 A1* | 9/2019 | Muntés-Mulero | ........................... G06F 11/0709 |
| 2020/0084085 A1* | 3/2020 | Tucker | ................ H04L 41/0613 |
| 2020/0193239 A1* | 6/2020 | Wilson | .................... G06F 18/24 |
| 2020/0374179 A1* | 11/2020 | Arrabolu | ............. H04L 41/0631 |
| 2021/0029003 A1* | 1/2021 | Morman | ............. H04L 41/0631 |

OTHER PUBLICATIONS

Mell et al., "The NIST Definition of Cloud Computing", National Institute of Standards and Technology, Special Publication 800-145, Sep. 2011, 7 pages.

Stoner, "Monitor your applications by using the golden signals," IBM, Accessed May 4, 2021, Retrieved from the Internet: https://www.ibm.com/garage/method/practices/manage/golden-signals, 6 pages.

* cited by examiner

SCORING EVENTS AS LIKELY CAUSE EVENTS IN A RESOURCE NETWORK

STATEMENT REGARDING PRIOR DISCLOSURES BY THE INVENTOR OR A JOINT INVENTOR

The following disclosure(s) are submitted under 35 U.S.C. 102(b)(1)(A): IBM® Netcool Operations Insight® V1.6.1, Jonathan Ian Settle et al., made publicly available on Jul. 28, 2020.

BACKGROUND

The present invention relates to analysis of events in resources of a resource network, and more specifically, to scoring events as likely cause events.

Resource networks may be formed of a large variety of resources in the form of physical or virtual components as wide ranging as smart fridges, clouds, applications, etc. The resources in a resource network generate a large amount of data relating to the health and availability of the resources of, and services provided by, those networks. The data may be provided externally as events.

Management of Information Technology (IT) systems is an increasingly complex problem for large organizations with expanding IT infrastructures. Many organizations employ Network Operations Centers (NOCs) in which trained operators utilize IT Operations Management software to diagnose and repair problems, known as incidents, in real time as they occur within their IT infrastructure. Incidents are caused by problems which typically occur on physical or virtual devices within an IT infrastructure. Often these resources are relied on by one or more other resources in the infrastructure, referred to as child resources, which in turn may be depended on by their own children. Consequently, incidents might consist of alerts from multiple resources, each indicating a local problem.

Typically, incidents have a single root cause problem on a single problem resource. Each resource in an IT infrastructure typically has a range of problem states, each with a unique set of consequences for child resources. Operators are often able to diagnose root cause problems by determining the impact on child resources through inspection of the alerts associated with the given incident. This problem extends to other forms of resource networks where resources are interconnected.

These relationships can be represented using an extended resource network topology graph, which is a representation of the resource network as a graph with resources modeled as nodes and the connections between resources modeled as edges.

During an incident, alerts occur across the extended resource network topology graph. An incident is normally caused by one or more resources entering a problem state which may cascade down to child resources to form a problem graph or indeed this problem graph could be formed by one or more child resources entering problem states cascading upstream.

Currently, operators utilize domain knowledge to manually identify problem graphs. Operators aim to diagnose the root cause problem by inspecting the network topology and manually identifying a pattern presented by the problem graph to find the root cause. This allows the operators to collect related events in the identified graph to simplify the complexity of the incident and thus reduce the Mean Time to Know (MTTK).

Streams of event alerts may be provided in a human readable form of abbreviated language, such as "power off", "exception", etc. Teams of engineers are employed to monitor the state of resources or services and infer the status of said services using management systems. Given a set of events presented to those management systems, such teams may use tools that discover the entities comprising such computer networks and the relationships between those entities to aid in the determination of the most likely root event that causes other events.

The investigation of possible event causes may be time consuming when large numbers of event alerts are received.

SUMMARY

According to an aspect of the present invention there is provided a computer-implemented method for scoring events as likely cause events in a resource network, comprising: processing incoming events relating to resources in a resource network to correlate related events as a related group; mapping the events of the related group onto nodes of a sub-topology representing resources of the resource network and having edges representing relationships between the resources; and scoring each event by discovering one or more paths between the node event and other node events of the related group, wherein the scoring is based on a combination of an event classification weight and a discovered path score of aggregated relationship scores of edges of a discovered path.

The method has the advantage that it provides a relative score for events in a related group to indicate the most likely cause events based on the type of event and the relationship with other events by using a topology of resources and relationships.

The method may include ranking events in the related group based on their relative scores to determine a most likely proximate cause event in the related group.

The method may include classifying each of the incoming events into a category, wherein the categories represent event status types that cause events with each category having an event classification weight. Classifying each of the incoming events may take an event text summary, tokenize it using natural language processing, and classify it against predefined models to a category. The tokenizing may use natural language processing uses learning of word embeddings to classify the text into a category. The categories may include categories of event status types including a selection of the group of: availability, latency, traffic volume, saturation, exception, state change, informational, or other configured categories.

The classification may be based on the language used in event text summaries that are interpreted by natural language processing that is based on partial sentence fragments.

The method may include applying an additional event weighting based on a measure of event severity.

The method may include discovering paths between each node event and other node events in the related group using a shortest path discovering algorithm. The aggregated relationship scores of edges of a discovered path may aggregate directional relationship scores for edges of a discovered path. A discovered path score may be a highest score of all discovered paths for the event.

The method may include configuring event classification weights and directional relationship scores to obtain relative scores of events to rank proximate cause events highly.

The method may include dynamically mapping and scoring events such that the scores are updated as related events occur including extending the sub-topology as required to include resources of related events.

According to another aspect of the present invention there is provided a computer-implemented method for scoring events as likely cause events in a resource network, comprising: processing incoming events relating to resources in a resource network to correlate a related group of incoming events; obtaining a sub-topology of a topology having nodes representing resources in the resource network and edges representing relationships between the resources, wherein the sub-topology graph includes nodes representing resources at which the related group of incoming events have occurred; mapping the incoming events of the related group onto the sub-topology graph as node events and discovering paths between the node events; and scoring each node event relative to other node events in the related group based on scores of one or more discovered paths between the node event and other node events.

According to a further aspect of the present invention there is provided a system for scoring events as likely cause events in a resource network, comprising: a processor and a memory configured to provide computer program instructions to the processor to execute the function of the components: an event correlating component for processing incoming events relating to resources in a resource network to correlate related events as a related group; an event mapping component for mapping the events of the related group onto nodes of a sub-topology representing resources of the resource network and having edges representing relationships between the resources; and an event scoring component for scoring each event by discovering one or more paths between the node event and other node events of the related group, wherein the scoring is based on a combination of an event classification weight and a discovered path score of aggregated relationship scores of edges of a discovered path.

The system may include a ranking component for ranking events in the related group based on their relative scores to determine a most likely proximate cause event in the related group.

The system may include a classifying component for classifying each of the incoming events into a category, wherein the categories represent event status types that cause events with each category having an event classification weight. The classifying component may take an event text summary, tokenize it using natural language processing using learned word embeddings, and classify it against predefined models to a category.

The system may include an event severity component for applying an additional event weighting based on a measure of event severity.

The system may include a path discovering component for discovering paths between each node event and other node events in the related group using a shortest path discovering algorithm.

The event scoring component may include an aggregating component for aggregating directional relationship scores for edges of a discovered path. The event scoring component may use a highest score of all discovered paths for the event as the discovered path score.

The method may include a configuring component for configuring event classification weights and directional relationship scores to obtain relative scores of events to rank proximate cause events highly.

The event mapping component may dynamically map events such that the mapping is updated as related events occur including extending the sub-topology as required to include resources of related events.

According to a further aspect of the present invention there is provided a system for scoring events as likely cause events in a resource network, comprising: a processor and a memory configured to provide computer program instructions to the processor to execute the function of the components: an event correlating component for processing incoming events relating to resources in a resource network to correlate a related group of incoming events; a sub-topology obtaining component for obtaining a sub-topology of a topology having nodes representing resources in the resource network and edges representing relationships between the resources, wherein the sub-topology includes nodes representing resources at which the related group of incoming events have occurred; an event mapping component for mapping the incoming events of the related group onto the sub-topology as node events and discovering paths between the node events; and an event scoring component for scoring each node event relative to other node events in the related group based on scores of one or more discovered paths between the node event and other node events The system may include a classifying component for classifying each of the incoming events into a category, wherein the categories represent event status types that cause events with each category having an event classification weight.

According to a further aspect of the present invention there is provided a computer program product for scoring events as likely cause events in a resource network, the computer program product comprising a computer readable storage medium having program instructions embodied therewith, the program instructions executable by a processor to cause the processor to: process incoming events relating to resources in a resource network to correlate related events as a related group; map the events of the related group onto nodes of a sub-topology representing resources of the resource network and having edges representing relationships between the resources; and score each event by discovering one or more paths between the node event and other node events of the related group, wherein the scoring is based on a combination of an event classification weight and a discovered path score of aggregated relationship scores of edges of a discovered path.

According to a further aspect of the present invention there is provided a computer program product for scoring events as likely cause events in a resource network, the computer program product comprising a computer readable storage medium having program instructions embodied therewith, the program instructions executable by a processor to cause the processor to: process incoming events relating to resources in a resource network to correlate a related group of incoming events; obtain a sub-topology of a topology having nodes representing resources in the resource network and edges representing relationships between the resources, wherein the sub-topology graph includes nodes representing resources at which the related group of incoming events have occurred; map the incoming events of the related group onto the sub-topology graph as node events and discover paths between the node events; and score each node event relative to other node events in the related group based on scores of one or more discovered paths between the node event and other node events.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
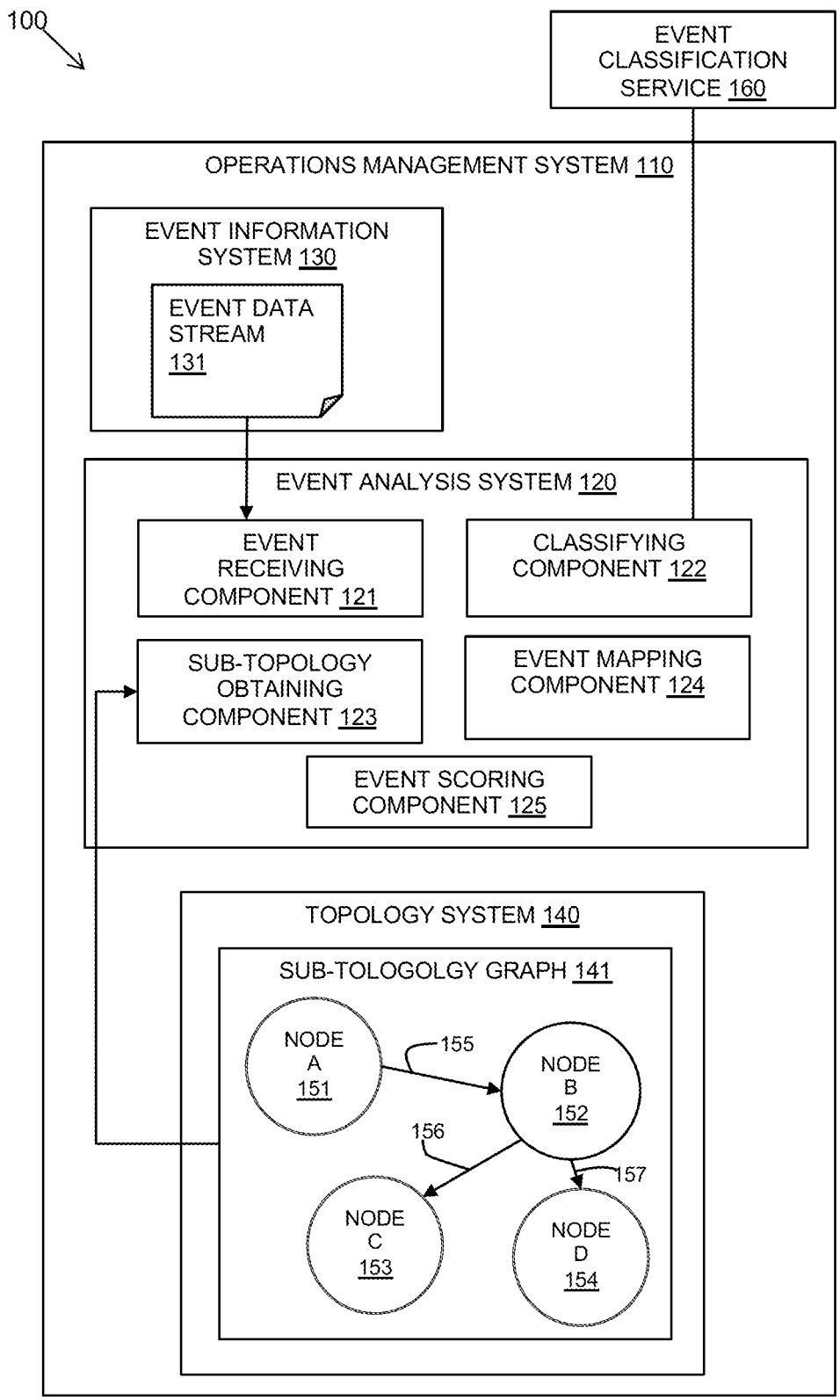
FIG. 1 is a block diagram of an example embodiment of a system in accordance with at least one embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and a system are provided for scoring events as likely proximal cause events in a resource network. A resource network may be broadly defined as including a network of linked resources such as a resource network formed of resources in the form of physical and/or virtual components. A resource network may also be at a software level abstraction, such as in an application with the application made up of multiple communicating components. In a resource network, the resources are related to each other by directional relationships. For example, a relationship may be that a component "depends on" another component or "is managed by" another component.

Operations management systems are known that provide network topologies for visualization and analysis of resource networks. A "network topology" is a representation of a resource network as a graph with resources modeled as nodes and the connections between resources modeled as edges. A "network sub-topology" is a subgraph of the graph representing a sub-set of the resource network.

The described method and system provide event analysis of events provided in a stream of event alerts by combining a classification of the events into categories of event types with a mapping of the events onto a sub-topology graph of resources to which the events relate to discover topological relationships and to score these relationships to provide an identification of the likely proximal cause events.

This may be used in the determination of the proximate cause of a change in status of a service provided by the resource network. "Proximate cause" is an event that is likely to be a cause of other events that are symptoms of that proximate cause. For example, the unavailability of a network routing service may be caused by the cessation of a power supply to a core device that supports that routing service.

The method and system may classify events into an extended set of classes beginning with the "four golden signals" of latency, traffic, error rate, and saturation. The classification in combination with the use discovered topological relationships between the events is used to determine a relative score for the likelihood of an event being a proximate cause event in a correlated group of events.

Events manifest as electronic records of changes of the status and state of components and services of a resource network. "State" may indicate that any attribute of the component has changed (e.g. memory usage, disk usage, physical location). "Status" may indicate that the resource or service has entered a state that is of threat to ongoing business activity (e.g. available/not available, responsive/not responsive). The discipline of Site Reliability Engineering (SRE) has identified four golden signals as important ways in which changes to state may lead to notable a change of status, namely: error rate; saturation; traffic; and latency. These four golden signals are used as a basis for the classification of events used in the described method.

Referring to FIG. 1, a block diagram 100 shows an example embodiment of an operations management system 110 in which the described event analysis system 120 is incorporated. The operations management system 110 may manage a resource network and may include an event information system 130 for receiving an event data stream 131 in the form of event alerts relating to resources of the resource network. The operations management system 110 may manage resource networks of various types including IT infrastructure networks or software level component resources, or other forms of resource networks with resources being logical or physical components.

The operations management system 110 may be used to manage a resource network and may include a topology system 140 for providing sub-topology graphs 141 of portions of the IT system for visualization and analysis of the resources. A sub-topology graph 141 may have nodes 151-154 representing resources in the resource network connected by edges 155-157 representing directional relationships between the resources represented by the nodes 151-154.

The operations management system 110 may include an event information system 130 for receiving an event data stream 131 in the form of event alerts relating to resources of the resource network. The event information system 130 may be associated with the topology system 140 such that events are enriched with topological resource information.

The described event analysis system 120 may carry out the method as described in more details with respect to the flow diagram 200 of FIG. 2 below. The event analysis system 120 may include an event receiving component 121 for receiving an event alert stream 131 from the event information system 130 and a classifying component 122 for classifying events. The classifying component 122 may use an external classification service 160 as described further below. The event analysis system 120 may include a sub-topology obtaining component 123 for interaction with the topology system 140 to obtain a relevant sub-topology relating to the events and an event mapping component 124 for mapping events to the sub-topology. The event analysis system 120 may include an event scoring component 125 for scoring events based on discovering and scoring of paths in the sub-topology graph 141 between events.

Figure 2:
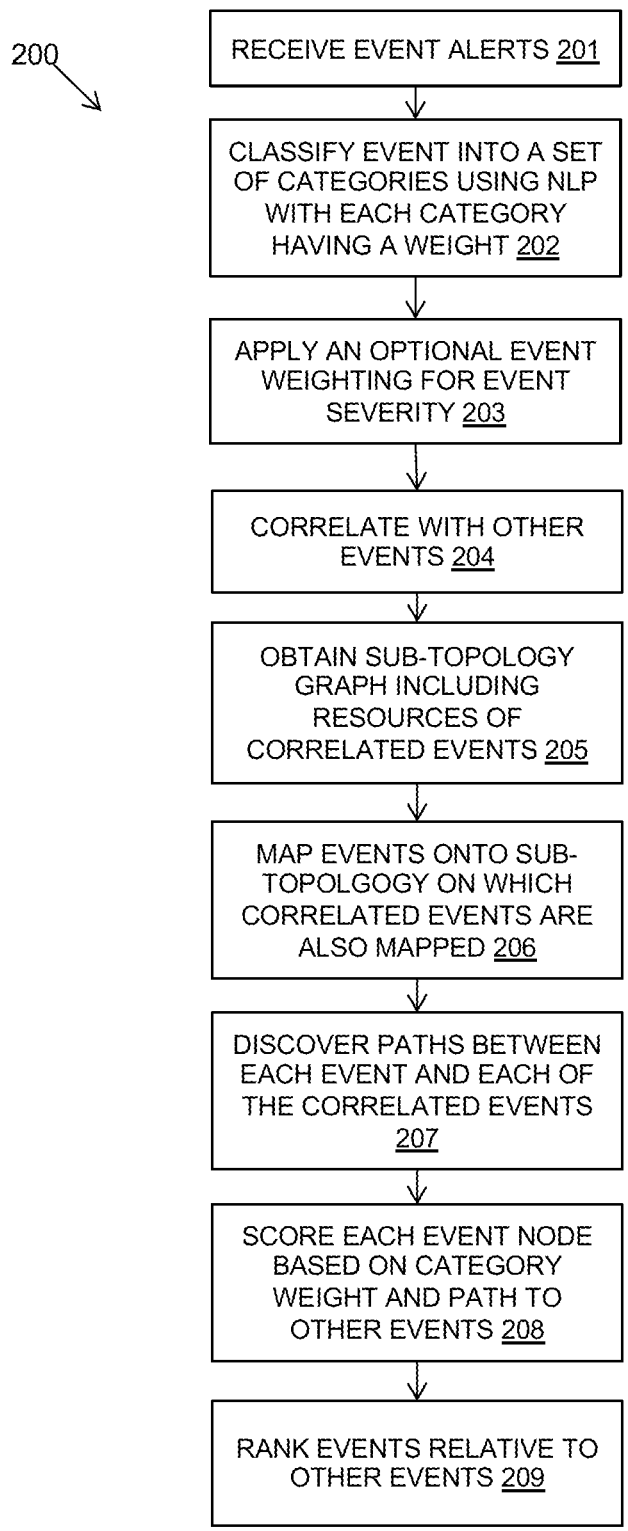
FIG. 2 is a flow diagram of an example embodiment of a method in accordance with at least one embodiment.

Referring to FIG. 2, a flow diagram 200 shows an example embodiment of the described method for scoring events as likely cause events in a resource network.

The method receives 201 event alerts, for example, from an event alert stream and classifies 202 each of the events into an event type category with each category having a configured category weight.

Classifying 202 each of the incoming events into an event type category uses natural language processing of an alert text of an event using learning of word embeddings to evaluate the alert text and to determine the event type category. The event type categories are categories of statuses that cause events. An event alert may be in human readable text that is abbreviated and not formed into full sentences, such as "Power off", "Exception", etc. The classification 202 may use a natural language processing classifier that is trained to classify non-sentences to parts of sentences using a library for learning word embeddings where words or phrases from a vocabulary are tokenized by mapping to vectors of real numbers.

The categories may be based on the golden signals of: error rate, latency, traffic, and saturation, with extension and possible customization to other categories that may be configured, such as: exception, state change, information, etc. The different types of category may be customized domain specific categories.

Each category may have a category weight that is configured to provide a weighting for a seriousness of an event category when considered in the context of error causes. For example, an error rate may have a lower weighting than saturation, as error rates are an expected consequence if saturation is 100% utilized. Latency can be due to a system not serving the response quickly enough because it is saturated. Different weights are used to allow the system to determine how important each event is relative to other events, for example: traffic 1.98; saturation 1.8; latency 1.7; state change 1.6; error 1.5; information 1.0.

An optional additional event weighting may be applied 203 for events to take into account a measure of event severity.

As event alerts are received 201, they are correlated 204 with other events in order to group a related group of incoming events as relating to an incident. This may use one of a number of known correlation methods between events, for example, events occurring at a similar time, from a single application, etc. There may be 1000s of events occurring.

The method may obtain 205 a sub-topology graph of a topology having nodes representing resources in the resource network and edges representing relationships between the resources. The sub-topology graph is a portion of the topology that includes nodes in the topology representing resources at which the related group of incoming events have occurred.

The method may map 206 the incoming events of the related group onto the sub-topology graph nodes of resources that the events are associated with. These are referred to as "node events" overlaid on the sub-topology graph to see the relationships between them. A node in the sub-topology graph representing a resource may have multiple events mapped to it as node events that may be classified into different categories.

The method may discover 207 paths between the nodes events that are correlated together by navigating between pairs of nodes of the sub-topology graph at which node events occur using a path navigating method, such as a shortest path algorithm or other suitable path navigation method. Paths may be worked out from every node event to every other node event in a highly performed way. There does not need to be an event on every node in the path.

The method may score 208 each node event relative to other nodes events in the related group. The scoring is based on a combination of a category weight for the node event and a path score based on an aggregation of directional relationship scores of each of the edges of a path to another node event. The category weights and directional relationship scores are configured to provide a combined score of the likelihood that a node event is a proximate cause event causing the events on the other nodes.

Directional weights for each edge relationship are provided as a relationship in a first direction may be more likely to cause a resultant event than the opposition direction. For example, a relationship of "depends on" will have a higher weight in a direction to the dependent node than from the dependent node.

In one example embodiment, the score may be the event category score multiplied by the sum of the edge path scores. In other embodiments, the score may be a combination of the scores of the multiple discovered paths.

The method of scoring may take account of the "noisy neighbor" problem as the scoring is agnostic of the resource as the event category weight is used and not a node weight.

The category weight can result in inverting the directional relationship. For example, an event at a first resource may cause a performance issue against a "depends on" relationship with a second resource, and this will be picked up in the scoring method as the category weight of the event may be "traffic" and this is of higher weighting than a "saturation" event at the second resource.

As a node representing a resource may have multiple events mapped to it as node events that may be classified into different categories, each such event at a node may have different scores.

The method may rank 209 events based on their relative scores to determine a most likely proximate cause event and may output the ranking and/or an indication of top ranked events.

The method may be carried out dynamically as event alerts are received 201 such that the scores are updated as new correlated node events occur. This may include extending the sub-topology as required as new correlated events arrive that are mapped to new nodes.

Figure 3:
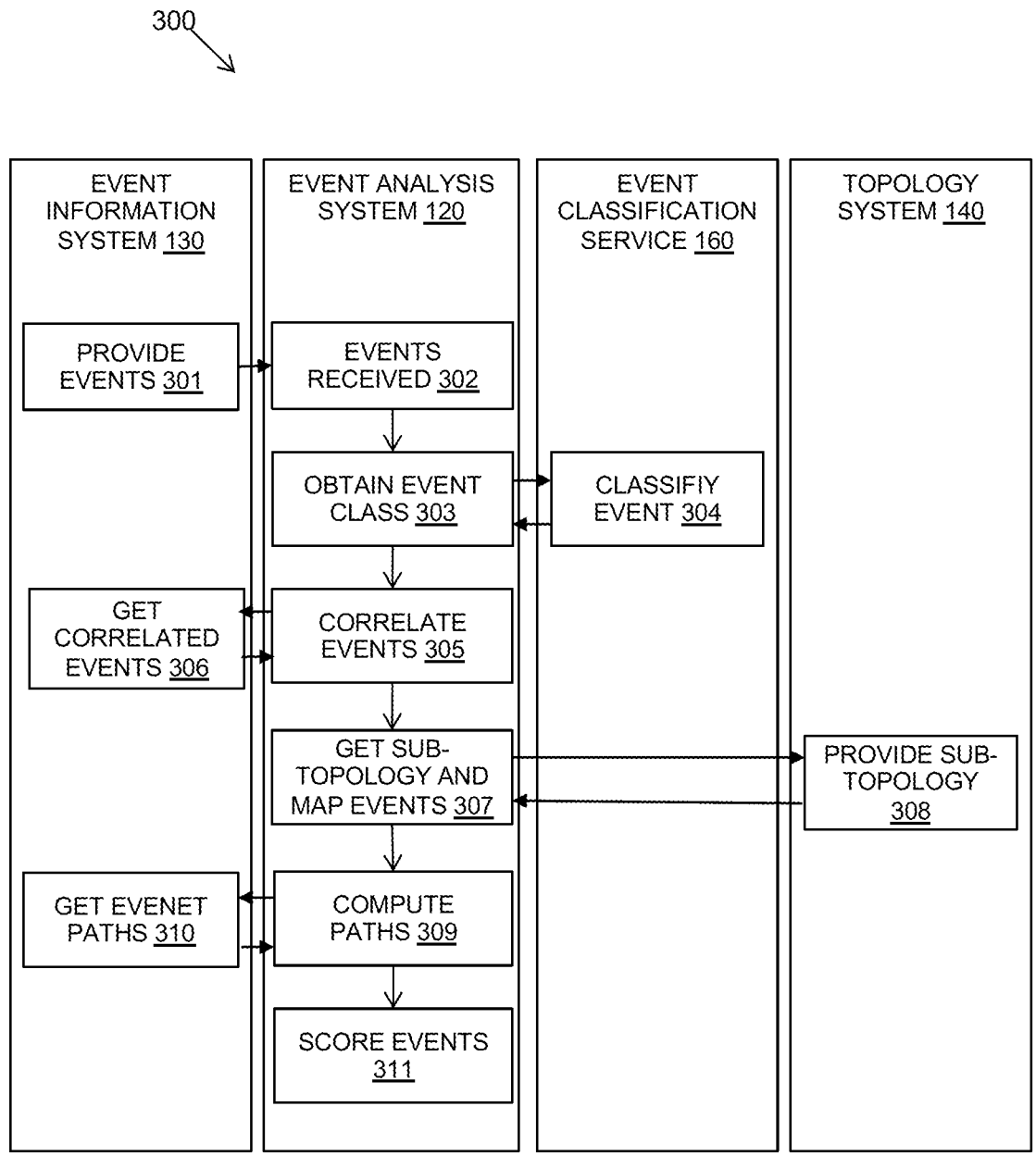
FIG. 3 is a swim-lane flow diagram of another example embodiment of a method in accordance with at least one embodiment.

Referring to FIG. 3, a swim lane flow diagram 300 shows another example of the described method with method steps shown between components of the system 100 shown in FIG. 1.

The method is carried out at the event analysis system 120 with data and information gathered from an event information system 130, a topology system 140, using an event classification service 160.

The event information system 130 may provide events 301 which are received 302 at the event analysis system 120. Events are received with topological resource information enriched into them. For example, a status message may be received at the event analysis system 120 on a topic of "enriched events".

The method at the event analysis system 120 may obtain 303 event classifications from an event classification service 160 by sending event summaries which the event classification service 160 uses to classify events 304 and return the event classifications to the event analysis system 120. The classification service 160 takes the event summary, tokenizes it, and classifies it against the models to create an event class of the proposed categories.

In an embodiment of the classification service 160, the events may be classified by a manual (by rule) or statistical (by machine learning) classification method into an extended set of categories for events {Latency, Error Rate, Saturation, Traffic} U X. Where, X denotes classes for events that do not correspond to elements of {Latency, Error Rate, Saturation, Traffic}.

Examples of X include, but are not limited to {Exception, StateChange, Information}. These are defined as follows:

Exception: A singular error of notable impact. For example, a data center outage, an application crash, or the failure of a single point of failure.

StateChange: A notable change of state of a managed entity that could have, but has not necessarily, lead to a fault state in that entity.

Information: An observation about that entity that does not correspond to a recognized change of state for that entity per se. For example, a change in the weather in the vicinity of that entity.

The method at the event analysis system 120 may correlate 305 events and the correlated events may be fetched 306 from the event information system 130.

The method at the event analysis system 120 may get 307 the relevant sub-topology for the correlated events from the topology system 140 and may map the events to the sub-topology. The sub-topology may be fetched from a topology data cache or from a backend storage.

The method at the event analysis system 120 may compute paths 309 between the nodes of the sub-topology that have correlated events and may get 310 the paths from the event information system. The method at the event analysis system 120 may score 311 the events.

In this way, the event analysis system 120 takes an event alert output, gets the relevant sub-topology, calculates a shortest path between events at resources, queries a classification service, and then calculates the relative event score per sub-topology.

Figure 4A:
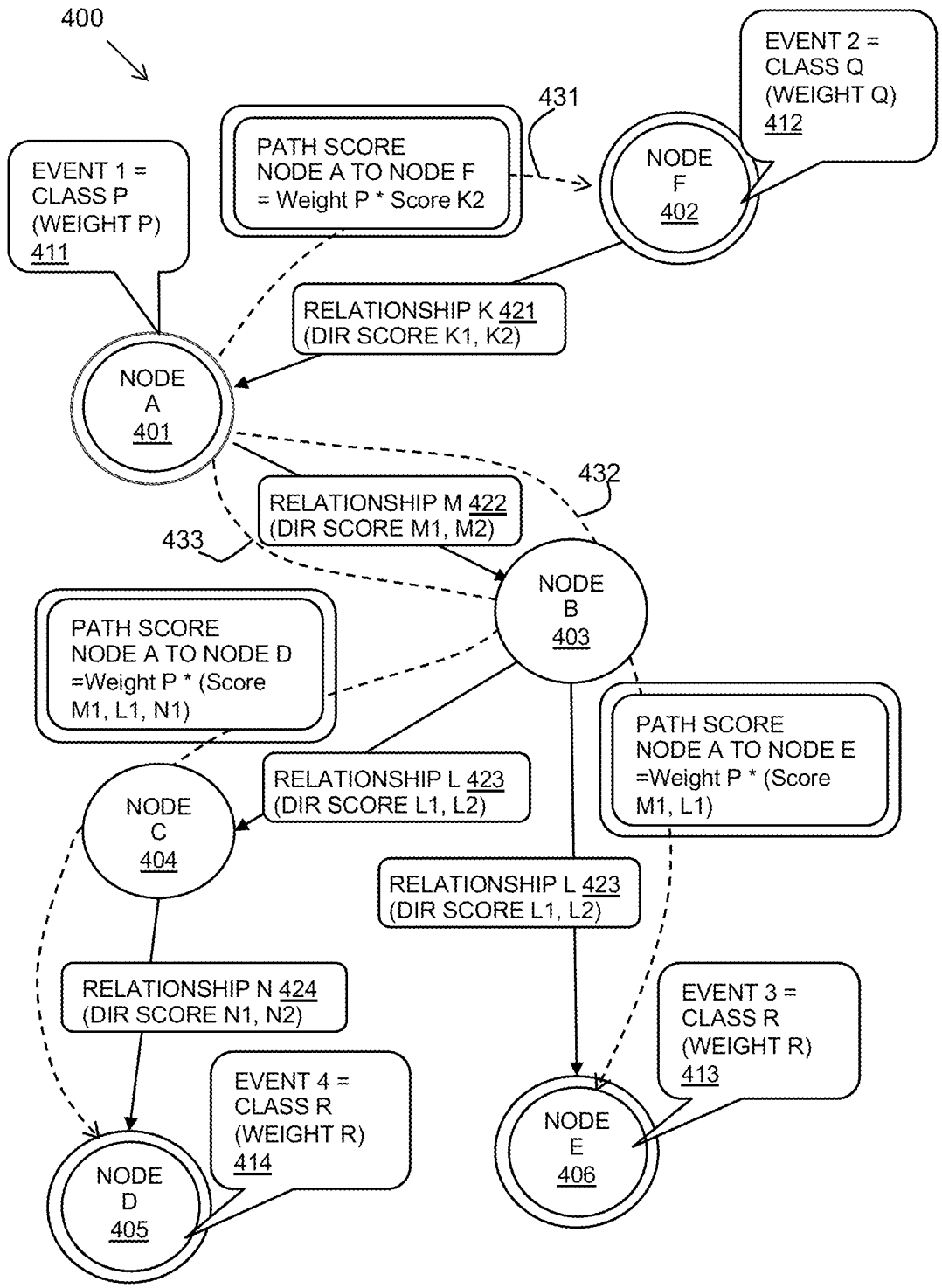
FIG. 4A is a schematic diagram illustrating an example embodiment of an aspect of the described method.

Referring to FIG. 4A, a schematic diagram 400 shows a sub-topology graph formed of nodes A, B, C, D, E, F 401-406. Some of the nodes 401-406 have correlated events mapped to them to form node events 411, 412, 413, 414 that are shown at the double bordered nodes 401, 402, 405, 406.

The node events 411-414 are classified with each class having a configured weight:
Event 1=Class P=Weight P;
Event 2=Class Q=Weight Q;
Event 3=Class R=Weight R;
Event 4=Class R=Weight R.

The edges between the nodes 401-406 in the sub-topology have directional relationships, with configured directional scores. The directional scores have a first score in the direction of the arrow and a second score against the arrow:
Relationship K 421=Directional scores K1, K2;
Relationship M 422=Directional scores M1, M2;
Relationship L 423=Directional scores L1, L2;
Relationship N 424=Directional scores N1, N2.

In FIG. 4A, Event 1 411 at Node A 401 is correlated to other events, namely Event 2 412, Event 3 413, Event 4 414 at Nodes F 402, E 406, D 405 respectively.

Event 1 411 is scored by discovering the three paths 431, 432, 433 from Event 1 411 to each of Event 2 412 at Node F 402, Event 3 413 at Node E 406, and Event 4 414 at Node D 405.

The first path 431 from Event 1 411 to Event 2 412 from Node A 401 to Node F 402, is a direct path against the direction of relationship K 421, so relationship score K2 is applied. The first path score for Event 1 411 is (Weight P*Score K2). If an additional weighting is provided for an event severity, this may also be applied to each path score.

The second path 432 from Event 1 411 to Event 3 413 from Node A 401 to Node E 406, is a path via Node B 403 in the direction of relationship M 422 (so score M1) and in the direction of relationship L 423 (so score L1). The second path score for Event 1 411 is (Weight P*Score M1, L1).

The third path 433 from Event 1 411 to Event 4 414 from Node A 401 to Node D 406, is a path via Node B 403 and Node C 404 in the direction of relationship M 422 (so score M1), in the direction of relationship L 423 (so score L1), and in the direction of relationship N 424 (so score N1). The third path score for Event 1 411 is (Weight P*Score M1, L1).

So three paths have been found and three scores generated for Event 1 411 at Node A 401 providing a relative indication of Event 1 compared to each of Event 2, 3, and 4. The maximum score for Event 1 411 from the three path scores is taken. The event score may be based on a combination of the path scores instead of the maximum path score to take into account to other paths that have been discovered.

The same scoring method is carried out for each of the correlated events using the reverse paths, so for each of Event 2 412, Event 3 413, and Event 4 414. The events can then be relatively ranked to determine the most likely proximate cause event of the correlated events.

The scoring system includes the event category weight in order to balance the overall score of the event. If the prediction is unknown for any reason, the scoring weight may be set to −1 to avoid any bias score that sums to 0.

A score is giving to each known edge type in both directions: out-degree and in-degree. Depending on the edge type and direction, a higher or lower value is assigned to the direction. For example: depends on, out-degree 5, in-degree 10. The edge score value may change.

If the edge type is unknown, an edge label score may be used as default, where the edge label is numerically calculated to use the max of (in-degree weight average, out-degree weight average) of the edge types of the label.

Figure 4B:
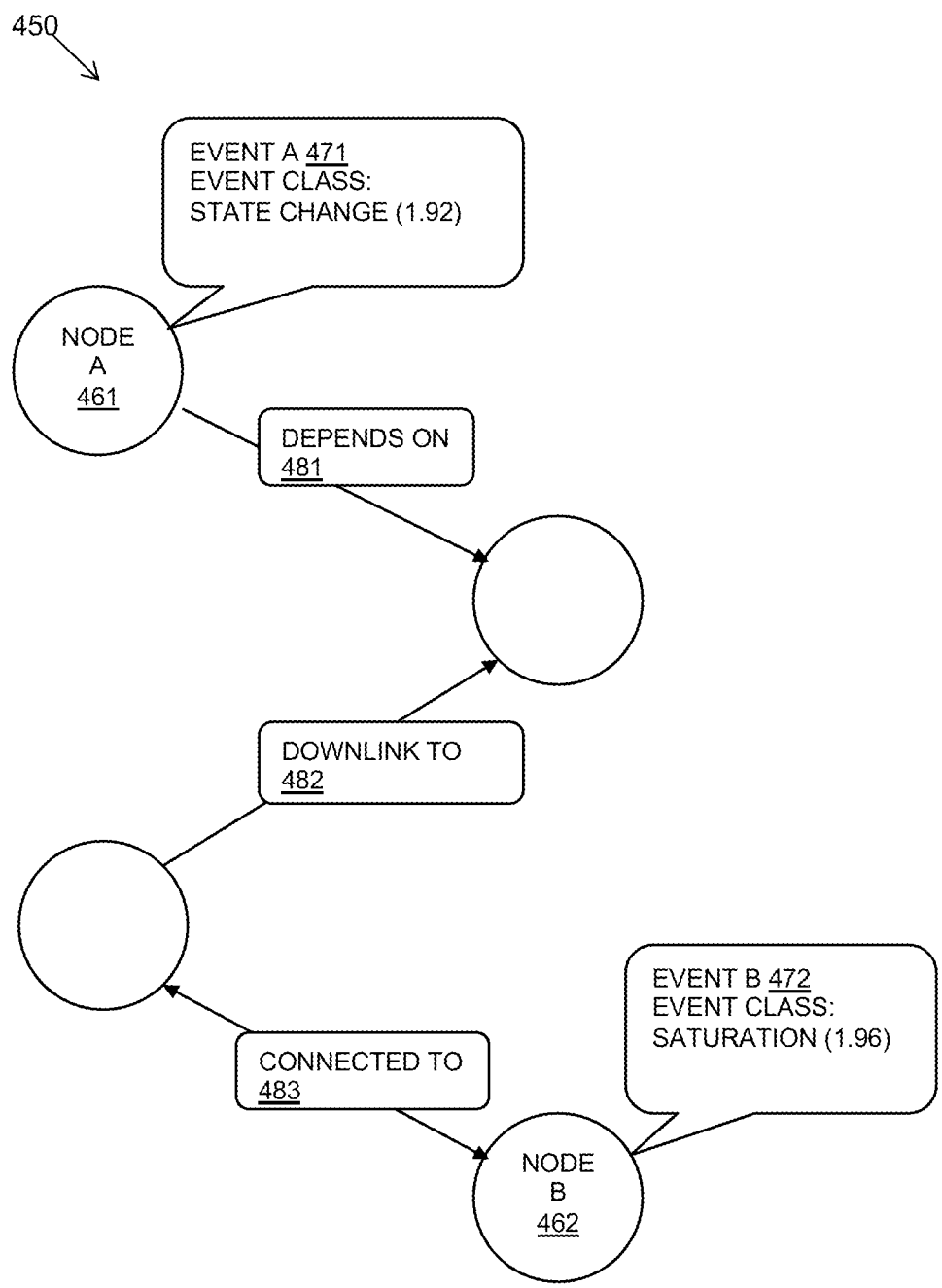
FIG. 4B is a schematic diagram illustrating an example embodiment of a path scoring aspect of the described method.

Referring to FIG. 4B, a schematic diagram 450 shows an example path score.

An Event A 471 is mapped to Node A 461. Event A 471 is classified to the category of "State Change" which has a weight of 1.92.

An Event B 472 is mapped to Node B 462. Event B 472 is classified to the category of "Saturation" which has a weight of 1.96.

A path between Node A 461 and Node B 462 includes three directional edges: "depends on" 481, "downlink to" 482, and "connected to" 483. Each directional relationship has a score:
"depends on"—out-degree 5, in-degree 10;
"downlink to"—out-degree 3, in-degree 6;
"connected to"—out-degree 5, in-degree 5.

The path score for Event A 471 is: =Path(10,3,5)*Classification Weight (1.92). This may result in the score of (10+3+5)*(1.92)=34.56.

The path score for Event B 472 is: =Path(5,6,5)*Classification Weight (1.96). This may result in the score of (5+6+5)*(1.96)=31.36.

If multiple path scores are obtained for Event A, then the maximum path score is used when comparing Event A with Event B. The scores for the events may be ranked in a sub-topology as Max(Score A, Score B).

Event severity may also be measured and incorporated into the score, for example, as an additional event weighting. The discovered path score for an event may be calculated in other ways, for example, combining the path scores of all paths for an event with additional weightings for the paths.

Figure 5:
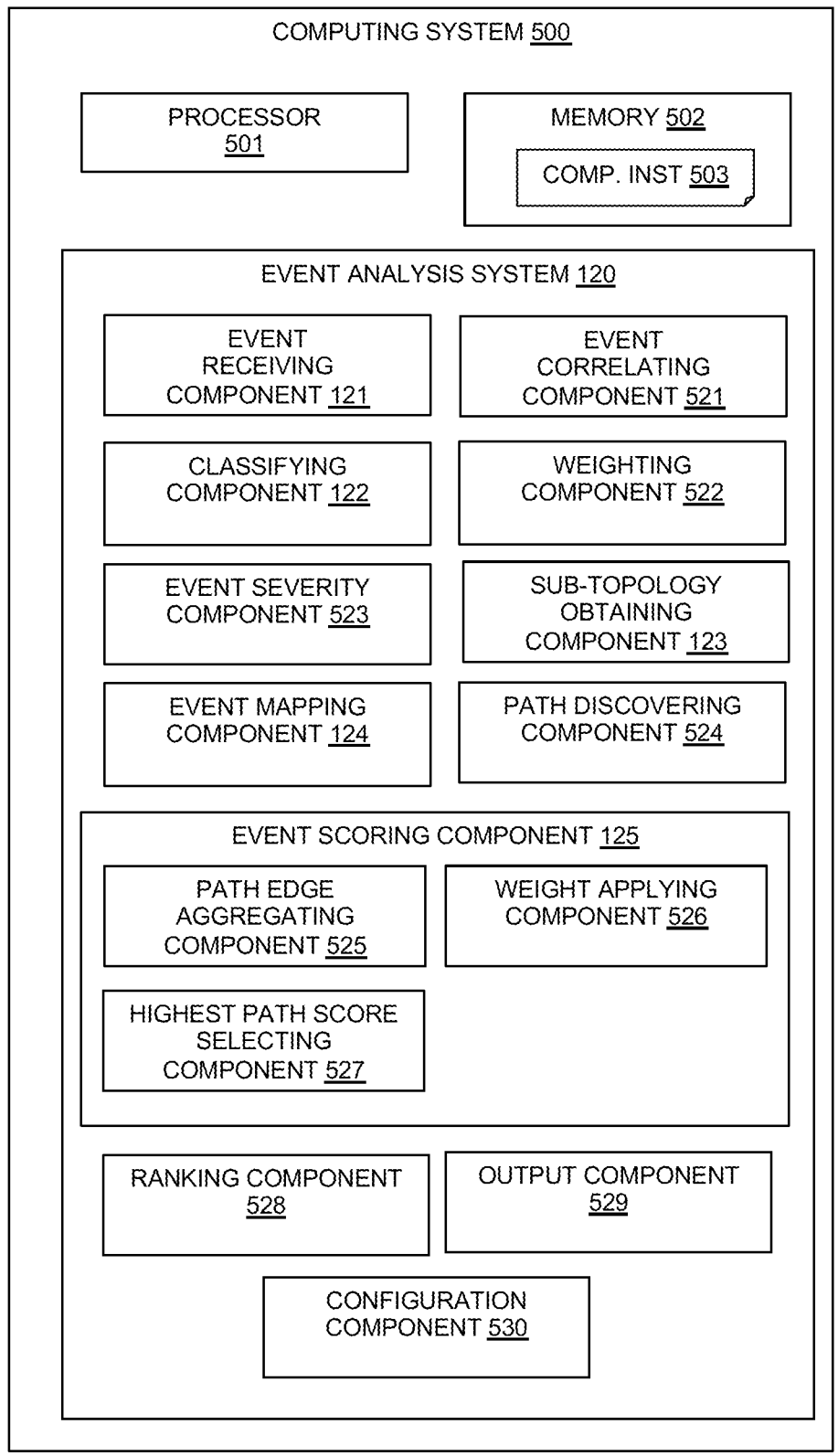
FIG. 5 is block diagram of an example embodiment of a system in accordance with at least one embodiment.

Referring to FIG. 5, a block diagram shows a computing system 500 at which the described event analysis system 120 may be provided. The computing system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The event analysis system 120 may include an event receiving component 121 for receiving an event stream and an event correlating component 521 for processing incoming events relating to resources in a resource network to correlate related events as a related group.

The event analysis system 120 may include a classifying component 122 for classifying each of the incoming events into a category. The classifying component 122 takes an event text summary, tokenizes it using natural language processing using learned word embeddings, and classifies it against predefined models to a category. The categories may represent event status types that cause events. The event analysis system 120 may include a weighting component 522 for providing an event weighting based on the category having an event classification weight.

The event analysis system 120 may include an event severity component 523 for applying an additional event weighting for the weighting component 522 based on a measure of event severity.

The event analysis system 120 may include a sub-topology obtaining component 123 for obtaining a sub-topology having nodes representing resources of the resource network at which the related group of events occur and having edges representing relationships between the resources and an event mapping component 124 for mapping the events of the related group onto nodes of the sub-topology as node events. The event analysis system 120 may include a path discovering component 524 for discovering paths between each node event and other node events in the related group using a shortest path discovering algorithm.

The event analysis system 120 may include an event scoring component 125 for scoring each event. The event scoring component 125 includes a path edge aggregating component 525 for aggregating directional relationship scores for edges of a discovered path, a weight applying component 526 for applying the classification weighting and, optionally, an event severity weighting, and a highest path score selecting component 527 for selecting a highest score of all discovered paths for the event as the discovered path score.

The event analysis system 120 may include a ranking component 528 for ranking events in the related group based on their relative scores to determine a most likely proximate cause event in the related group and an output component 529 for outputting the ranked events or the top events.

The event analysis system 120 may include a configuring component 530 for configuring event classification weights and directional relationship scores to obtain relative scores of events to rank proximate cause events highly.

Figure 6:
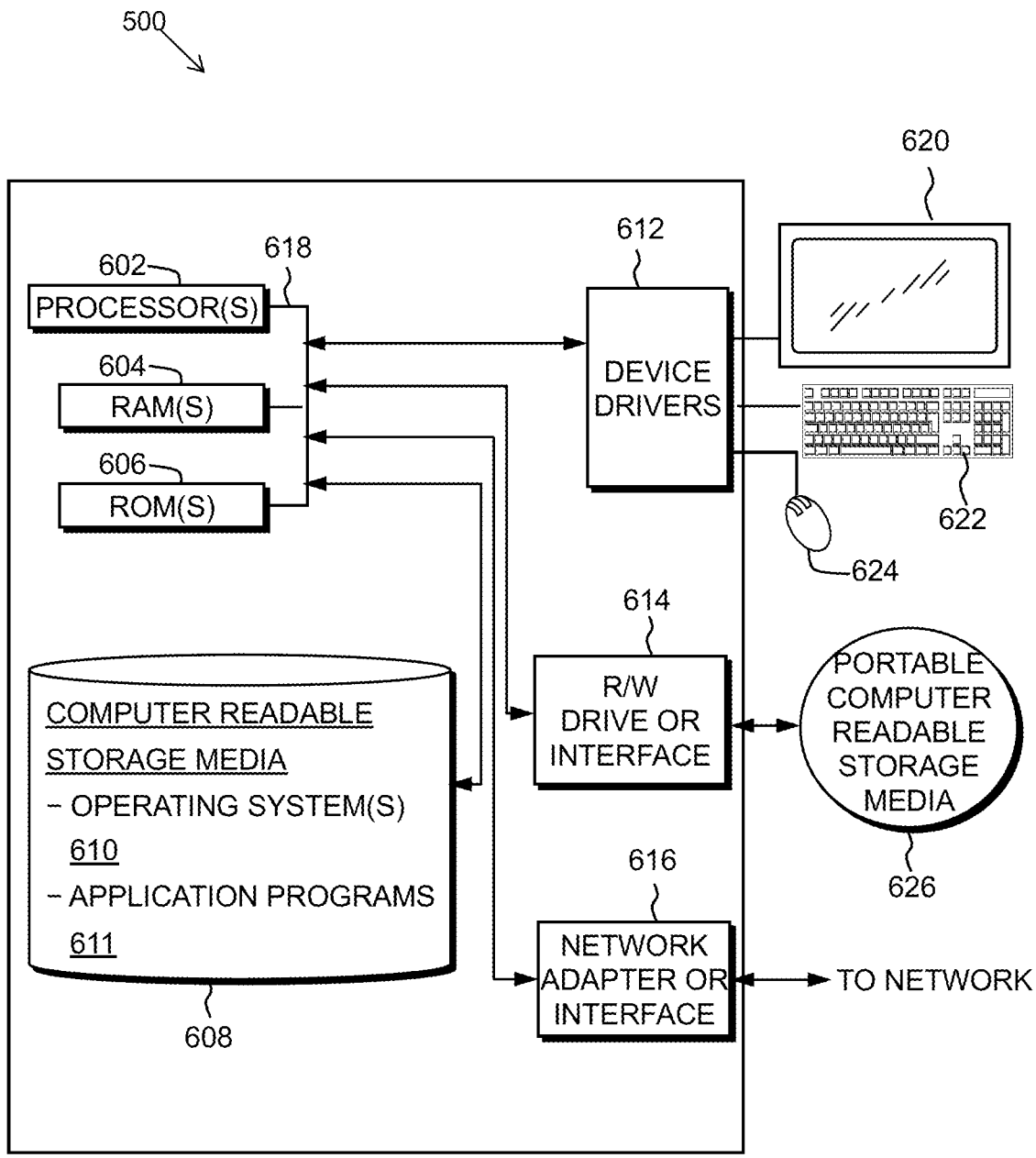
FIG. 6 is a block diagram of an embodiment of a computer system or cloud server in which the present invention may be implemented.

FIG. 6 depicts a block diagram of components of a computing system 500, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
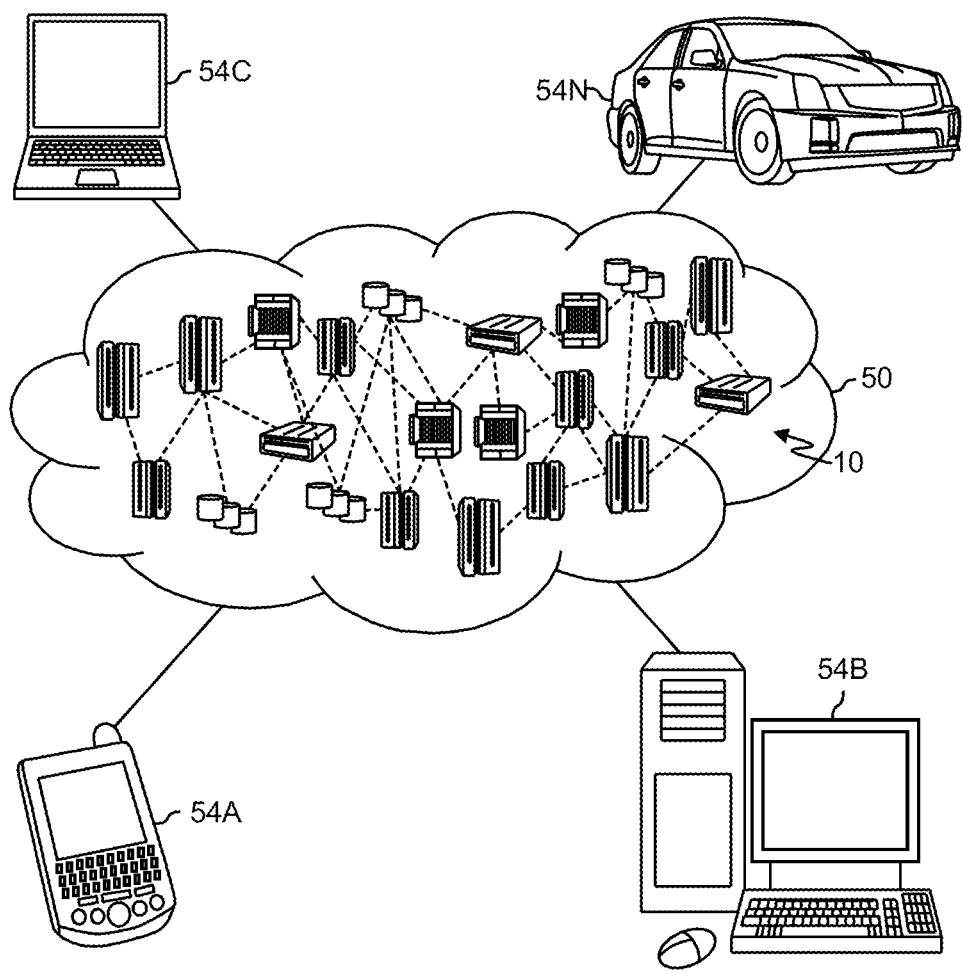
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
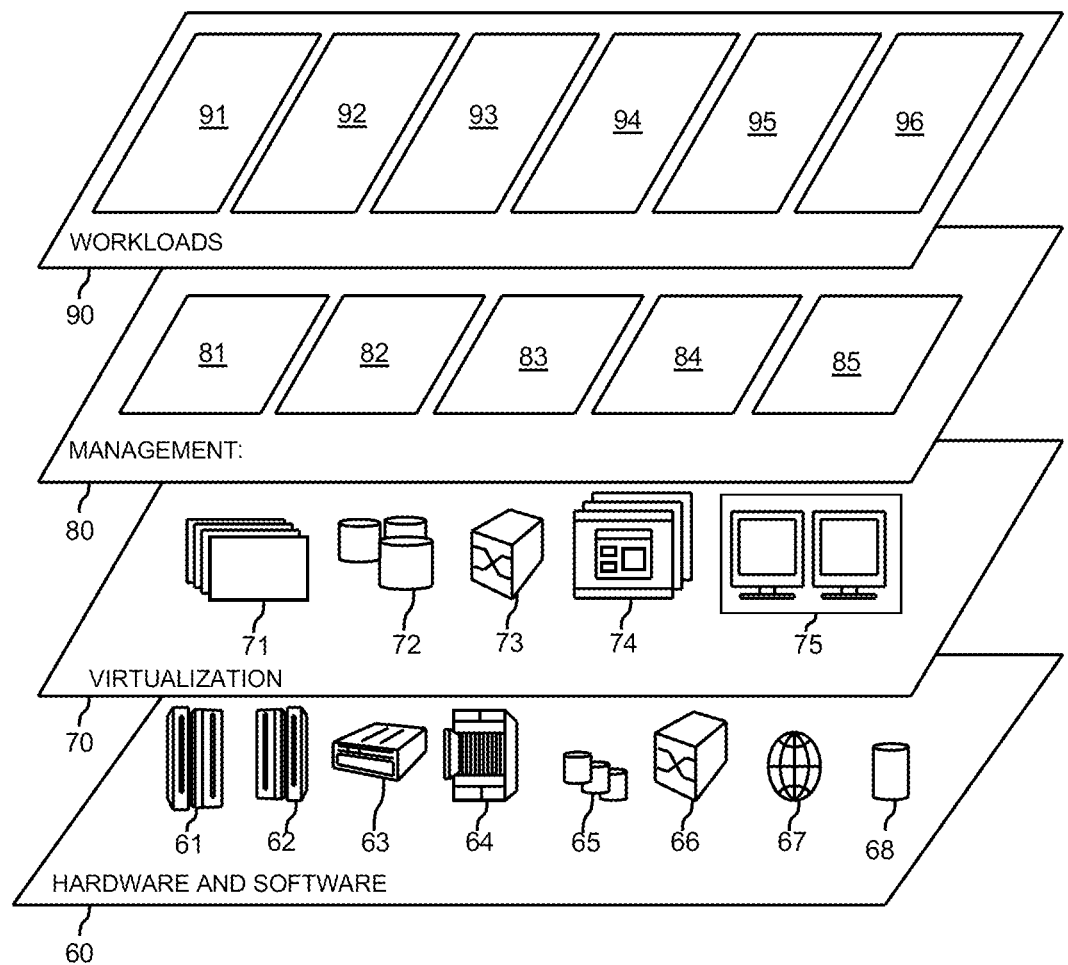
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for scoring events as likely cause events in a resource network, comprising:
   processing incoming events relating to resources in a resource network to correlate related events as a related group;
   classifying each of the incoming events into a category, wherein the categories represent event status types that cause events, and wherein each category has a different event classification weight;
   mapping the events of the related group onto nodes of a sub-topology representing resources of the resource network and having edges representing relationships between the resources;
   scoring each event by discovering one or more paths between a node event and other node events of the related group, wherein the scoring is based on a combination of an event classification weight of the node event and a discovered path score comprising aggregated directional relationship scores of edges of a discovered path from the node event to another node event of the related group, wherein a directional relationship score of an edge of the discovered path is configured according to a direction of relationship from the node event, and wherein the scoring indicates a likelihood of an event being a proximate cause event in the related group; and
   dynamically mapping and scoring events such that the scores are updated as new incoming correlated related events occur, wherein the dynamic mapping comprises extending the sub-topology as required to include new nodes representing resources of the new incoming correlated related events, and wherein the scoring is resource agnostic by being based on event classification weight rather than a node weight.

2. The method as claimed in claim 1, further comprising: ranking events in the related group based on their relative scores to determine a most likely proximate cause event in the related group.

3. The method as claimed in claim 1, wherein classifying each of the incoming events takes an event text summary, tokenizes it using natural language processing, and classifies it against predefined models to a category.

4. The method as claimed in claim 3, wherein the tokenizing using natural language processing uses learning of word embeddings to classify the text into a category.

5. The method as claimed in claim 1, wherein the categories include categories of event status types including a selection of the group of: availability, latency, traffic volume, saturation, exception, state change, informational, or other configured categories.

6. The method as claimed in claim 1, further comprising: applying, to the discovered path score, an additional event weighting based on a measure of event severity.

7. The method as claimed in claim 1, further comprising: discovering paths between each node event and other node events in the related group using a shortest path discovering algorithm.

8. The method as claimed in claim 1, wherein a discovered path score is a highest score of all discovered paths for the event.

9. The method as claimed in claim 1, further comprising: configuring event classification weights and directional relationship scores to obtain relative scores of events to rank proximate cause events highly.

10. A computer-implemented method for scoring events as likely cause events in a resource network, comprising:
    processing incoming events relating to resources in a resource network to correlate a related group of incoming events;
    classifying each of the incoming events into a category, wherein the categories represent event status types that cause events, and wherein each category has a different event classification weight;
    obtaining a sub-topology of a topology having nodes representing resources in the resource network and edges representing relationships between the resources, wherein the sub-topology graph includes nodes representing resources at which the related group of incoming events have occurred;

mapping the incoming events of the related group onto the sub-topology graph as node events and discovering paths between the node events;

scoring each node event relative to other node events in the related group based on scores of one or more discovered paths between a node event and other node events, wherein the scoring is based on a combination of an event classification weight of the node event and a discovered path score comprising aggregated directional relationship scores of edges of a discovered path from a node event to another node event of the related group, wherein a directional relationship score of an edge of the discovered path is configured according to a direction of relationship from the node event, and wherein the scoring indicates a likelihood of an event being a proximate cause event in the related group; and dynamically mapping and scoring events such that the scores are updated as new incoming correlated related events occur, wherein the dynamic mapping comprises extending the sub-topology as required to include new nodes representing resources of the new incoming correlated related events, and wherein the scoring is resource agnostic by being based on event classification weight rather than a node weight.

11. A system for scoring events as likely cause events in a resource network, comprising:

one or more processors, one or more computer-readable memories, one or more computer-readable tangible storage medium, and program instructions stored on at least one of the one or more tangible storage medium for execution by at least one of the one or more processors via at least one of the one or more memories to execute the function of the components:

an event correlating component for processing incoming events relating to resources in a resource network to correlate related events as a related group;

a classifying component for classifying each of the incoming events into a category, wherein the categories represent event status types that cause events, and wherein each category has a different event classification weight;

an event mapping component for mapping the events of the related group onto nodes of a sub-topology representing resources of the resource network and having edges representing relationships between the resources;

an event scoring component for scoring each event by discovering one or more paths between a node event and other node events of the related group, wherein the scoring is based on a combination of an event classification weight of the node event and a discovered path score comprising aggregated directional relationship scores of edges of a discovered path from the node event to another node event of the related group, wherein a directional relationship score of an edge of the discovered path is configured according to a direction of relationship from the node event, and wherein the scoring indicates a likelihood of an event being a proximate cause event in the related group; and dynamically mapping and scoring events such that the scores are updated as new incoming correlated related events occur, wherein the dynamic mapping comprises extending the sub-topology as required to include new nodes representing resources of the new incoming correlated related events, and wherein the scoring is resource agnostic by being based on event classification weight rather than a node weight.

12. The system as claimed in claim 11, further comprising:

a ranking component for ranking events in the related group based on their relative scores to determine a most likely proximate cause event in the related group.

13. The system as claimed in claim 11, wherein the classifying component takes an event text summary, tokenizes it using natural language processing using learned word embeddings, and classifies it against predefined models to a category.

14. The system as claimed in claim 11, further comprising:

an event severity component for applying, to the discovered path score, an additional event weighting based on a measure of event severity.

15. The system as claimed in claim 11, further comprising:

a path discovering component for discovering paths between each node event and other node events in the related group using a shortest path discovering algorithm.

16. The system as claimed in claim 11, wherein the scoring component uses a highest score of all discovered paths for the event as the discovered path score.

17. The system as claimed in claim 11, wherein the scoring component includes an aggregating component for aggregating directional relationship scores for edges of a discovered path.

18. The system as claimed in claim 11, further comprising:

a configuring component for configuring event classification weights and directional relationship scores to obtain relative scores of events to rank proximate cause events highly.

19. The system as claimed in claim 11, wherein the event mapping component dynamically maps events such that the mapping is updated as related events occur including extending the sub-topology as required to include resources of related events.

20. A system for scoring events as likely cause events in a resource network, comprising:

one or more processors, one or more computer-readable memories, one or more computer-readable tangible storage medium, and program instructions stored on at least one of the one or more tangible storage medium for execution by at least one of the one or more processors via at least one of the one or more memories to execute the function of the components:

an event correlating component for processing incoming events relating to resources in a resource network to correlate a related group of incoming events;

a classifying component for classifying each of the incoming events into a category, wherein the categories represent event status types that cause events, and wherein each category has a different event classification weight;

a sub-topology obtaining component for obtaining a sub-topology of a topology having nodes representing resources in the resource network and edges representing relationships between the resources, wherein the sub-topology includes nodes representing resources at which the related group of incoming events have occurred;

an event mapping component for mapping the incoming events of the related group onto the sub-topology as node events and discovering paths between the node events;

an event scoring component for scoring each node event relative to other node events in the related group based on scores of one or more discovered paths between a node event and other node events, wherein the scoring is based on a combination of an event classification weight and a discovered path score comprising aggregated directional relationship scores of edges of a discovered path from a node event to another node event of the related group, wherein a directional relationship score of an edge of the discovered path is configured according to a direction of relationship from the node event, and wherein the scoring indicates a likelihood of an event being a proximate cause event in the related group; and dynamically mapping and scoring events such that the scores are updated as new incoming correlated related events occur, wherein the dynamic mapping comprises extending the sub-topology as required to include new nodes representing resources of the new incoming correlated related events, and wherein the scoring is resource agnostic by being based on event classification weight rather than a node weight.

21. A computer program product for scoring events as likely cause events in a resource network, the computer program product comprising one or more computer-readable tangible storage medium and program instructions stored on at least one of the one or more tangible storage medium, the program instructions executable by a processor capable of performing a method, the method comprising:

processing incoming events relating to resources in a resource network to correlate related events as a related group;

classifying each of the incoming events into a category, wherein the categories represent event status types that cause events, and wherein each category has a different event classification weight;

mapping the events of the related group onto nodes of a sub-topology representing resources of the resource network and having edges representing relationships between the resources;

scoring each event by discovering one or more paths between a node event and other node events of the related group, wherein the scoring is based on a combination of an event classification weight and a discovered path score comprising aggregated directional relationship scores of edges of a discovered path from a node event to another node event of the related group, wherein a directional relationship score of an edge of the discovered path is configured according to a direction of relationship from the node event, and wherein the scoring indicates a likelihood of an event being a proximate cause event in the related group; and dynamically mapping and scoring events such that the scores are updated as new incoming correlated related events occur, wherein the dynamic mapping comprises extending the sub-topology as required to include new nodes representing resources of the new incoming correlated related events, and wherein the scoring is resource agnostic by being based on event classification weight rather than a node weight.

* * * * *